United States Patent
Lee et al.

(10) Patent No.: US 8,488,443 B2
(45) Date of Patent: Jul. 16, 2013

(54) METHOD FOR HANDLING RADIO LINE FAILURE IN MULTIPLE CARRIER SYSTEM

(75) Inventors: Young Dae Lee, Anyang-si (KR); Sung Hoon Jung, Anyang-si (KR); Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 12/938,689

(22) Filed: Nov. 3, 2010

(65) Prior Publication Data

US 2011/0103221 A1    May 5, 2011

Related U.S. Application Data (60) Provisional application No. 61/258,183, filed on Nov. 4, 2009.

(51) Int. Cl.
*H04W 28/04* (2009.01)
*H04W 4/00* (2009.01)
*H04L 12/26* (2006.01)
*H04B 17/00* (2006.01)

(52) U.S. Cl.
USPC ........... 370/216; 370/329; 370/228; 370/242; 455/67.11

(58) Field of Classification Search
USPC .............. 370/216, 242, 329, 228; 455/67.11
See application file for complete search history.

(56) References Cited

U.S. PATENT DOCUMENTS

| | | | |
|---|---|---|---|
| 2010/0195507 A1* | 8/2010 | Marinier et al. | 370/242 |
| 2010/0296389 A1* | 11/2010 | Khandekar et al. | 370/216 |
| 2011/0021154 A1* | 1/2011 | Marinier et al. | 455/67.11 |
| 2011/0103330 A1* | 5/2011 | Montojo et al. | 370/329 |
| 2011/0143675 A1* | 6/2011 | Damnjanovic et al. | 455/67.11 |
| 2011/0317552 A1* | 12/2011 | Lee et al. | 370/228 |
| 2012/0182879 A1* | 7/2012 | Tamura et al. | 370/242 |

FOREIGN PATENT DOCUMENTS

| | | |
|---|---|---|
| EP | 2 244 411 | 10/2010 |
| WO | 2010/088329 | 8/2010 |
| WO | 2010/105148 | 9/2010 |
| WO | 2010/135706 | 11/2010 |
| WO | 2010/144601 | 12/2010 |

* cited by examiner

*Primary Examiner* — Andrew Lai
*Assistant Examiner* — Albert Shih
(74) *Attorney, Agent, or Firm* — Morgan, Lewis & Bockius LLP (57) ABSTRACT

A method of handling a radio link failure in a multiple-carrier system performed by a user equipment (UE) is provided. The method includes transmitting, to a base station (BS), a first message indicating a first radio link problem (RLP) in a first carrier when the first RLP is detected, transmitting, to the BS, a second message indicating a second RLP in a second carrier when the second RLP is detected, and transmitting, to the BS, a final message requesting a connection re-establishment with the BS. By using a plurality of different timers on CCs configured for one UE, the meaning of RLF in a multiple-carrier system for triggering radio connection re-establishment procedure is clarified and defined in detail.

9 Claims, 7 Drawing Sheets

METHOD FOR HANDLING RADIO LINE FAILURE IN MULTIPLE CARRIER SYSTEM

CROSS-REFERENCE TO RELATED APPLICATIONS

This application claims the benefit of priority of U.S. Provisional Application No. 61/258,183 filed on Nov. 4, 2009 which is incorporated by reference in their entirety herein.

BACKGROUND

1. Field of the Invention

The present invention is related to a wireless communication system, more particularly to a method of handling a radio link failure in a multiple-carrier system.

2. Related Art

Wireless communication systems are widely spread all over the world to provide various types of communication services such as voice or data. In general, the wireless communication system is a multiple access system capable of supporting communication with multiple users by sharing available radio resources. Examples of the multiple access system include a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system, etc.

In the wireless communication system, one carrier is considered in general even if a bandwidth is differently set between an uplink and a downlink. In 3rd generation partnership project (3GPP) long term evolution (LTE), one carrier constitutes each of the uplink and the downlink on the basis of a single carrier, and the bandwidth of the uplink is symmetrical to the bandwidth of the downlink. However, except for some areas of the world, it is not easy to allocate frequencies of wide bandwidths. Therefore, as a technique for effectively using fragmented small bands, a carrier aggregation technique is being developed to obtain the same effect as when a band of a logically wide bandwidth is used by physically aggregating a plurality of bands in a frequency domain. The carrier aggregation includes a technique for supporting a system bandwidth of 100 mega Hertz (MHz) by using multiple carriers even if, for example, the 3GPP LTE supports a bandwidth of up to 20 MHz, and a technique for allocating an asymmetric bandwidth between the uplink and the downlink.

Meanwhile, the user equipment (UE) may be in a radio resource control (RRC) connected mode or in an idle mode. When the UE is in the RRC connected mode, a radio link between the UE and the BS is connected. However, when a channel state deteriorates, out-of-synchronization of a radio link may be generated from a physical layer of the UE. When the out-of-synchronization takes place consecutively more than a certain number of times, the UE declares a radio link failure (RLF). If no carrier aggregation is assumed, the UE detects out-of-synchronization indications only for one carrier. However, when carrier aggregation is used, multiple aggregated carriers are configured for one UE. Thus, when out-of-synch indications occur from multiple carriers, UE cannot properly declare radio link failure.

SUMMARY

The present invention provides a method of handling a radio link failure in a multiple-carrier system.

According to an aspect of the present invention, a method of handling a radio link failure in a multiple-carrier system performed by a user equipment (UE) is provided. The method includes transmitting, to a base station (BS), a first message indicating a first radio link problem for a first carrier if the first radio link problem is detected, transmitting, to the BS, a second message indicating a second radio link problem for a second carrier if the second radio link problem is detected, and transmitting, to the BS, a final message requesting a connection re-establishment. The first carrier and the second carrier are aggregated.

According to another aspect of the present invention, a method of handling a radio link failure in a multiple-carrier system performed by a base station (BS) is provided. The method includes receiving, from a user equipment (UE), a first message indicating a first radio link problem for a first carrier if the first radio link problem is detected by the UE, receiving, from the UE, a second message indicating a second radio link problem for a second carrier if the second radio link problem is detected by the UE, and receiving, from the UE, a final message requesting a connection re-establishment. The first carrier and the second carrier are aggregated.

DESCRIPTION OF EXEMPLARY EMBODIMENTS

Figure 1:
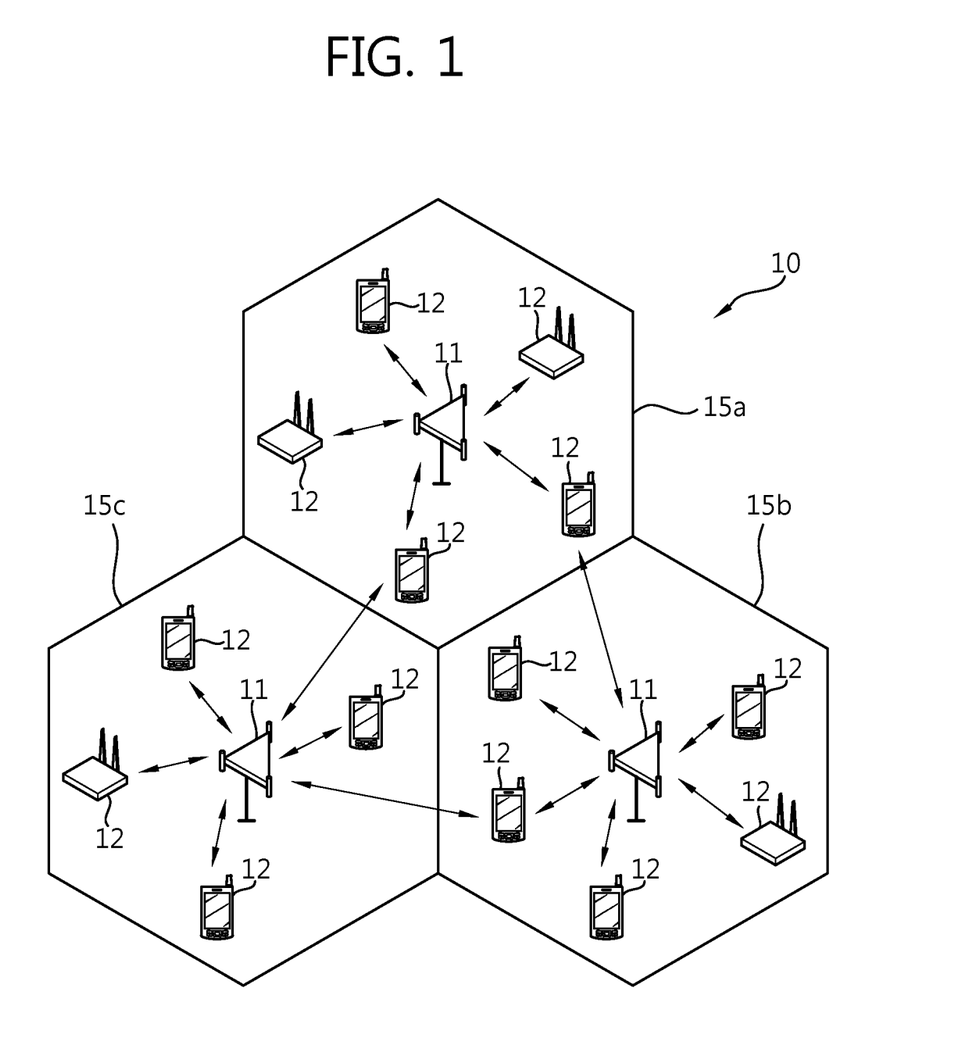
FIG. 1 illustrates a wireless communication system.

FIG. 1 illustrates a wireless communication system. A wireless communication system 10 includes at least one base station (BS) 11. Each base station 11 provides a communication service to particular geographical areas 15a, 15b, and 15c (which are generally called cells). Each cell may be divided into a plurality of areas (which are also called sectors). A user equipment (UE) 12 may be fixed or mobile, and may be referred to by other names such as mobile station (MS), user terminal (UT), subscriber station (SS), wireless device, personal digital assistant (PDA), wireless modem, handheld device, etc. The BS 11 generally refers to a fixed station that communicates with the UE 12 and may be called by other names such as evolved-node B (eNB), base transceiver system (BTS), access point (AP), etc. Downlink (DL) refers to communication from the BS 11 to the UE 12, and uplink (UL) refers to communication from the UE 12 to the BS 11. In the downlink, a transmitter may be a part of the BS 11 and a receiver may be a part of the UE 12. In the uplink, a transmitter may be a part of the UE 12 and a receiver may be a part of the BS 11.

A carrier aggregation supports a plurality of component carriers. A component carrier (CC) is defined by a bandwidth and a center frequency. A carrier can be an abbreviation of a CC. A carrier aggregation is adopted to support increasing throughput, prevent an increase in a cost due to an introduction of a wideband radio frequency (RF) element, and guarantee compatibility with an existing system. For example, if five carriers are assigned as granularity of carrier unit having a 5 MHz bandwidth, it can support a bandwidth of a maximum of 20 MHz.

The carrier aggregation may be divided into a contiguous carrier aggregation and a non-contiguous carrier aggregation. The contiguous carrier aggregation uses contiguous carriers and the non-contiguous carrier aggregation uses discontiguous CCs. The number of aggregated CCs may different in uplink and downlink. When the number of downlink CCs and that of uplink CCs are equal, it is called a symmetric aggregation, and when the numbers are different, it is called an asymmetric aggregation.

The size (i.e., the bandwidth) of multiple CCs may vary. For example, when five CCs are used to configure a 70 MHz band, they may be configured as 5 MHz CC (CC #0)+20 MHz CC (CC #1)+20 MHz CC (CC #2)+20 MHz CC (CC #3)+5 MHz CC (CC #4).

In the following description, a multi-carrier system refers to a system supporting multiple carriers based on the carrier aggregation. The contiguous carrier aggregation and/or non-continuous carrier aggregation may be used in the multi-carrier system, and in addition, either the symmetrical aggregation or the asymmetrical aggregation may be used.

Figure 2:
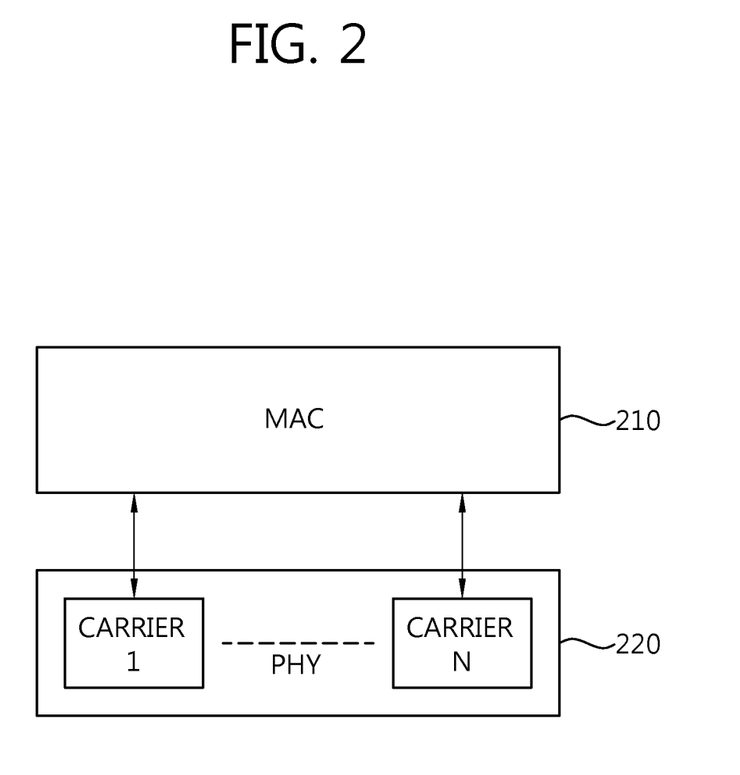
FIG. 2 illustrates an example of a protocol structure for supporting multiple carriers.

FIG. 2 illustrates an example of a protocol structure for supporting multiple carriers. A common medium access control (MAC) entity 210 manages a physical (PHY) layer 220 which uses a plurality of CCs. A MAC management message transmitted by a particular CC may be applied to other CCs. The PHY layer 220 may operate in a TDD (Time Division Duplex) and/or FDD (Frequency Division Duplex) scheme.

There are several physical control channels used in the physical layer 220. A physical downlink control channel (PD-CCH) may inform the UE about the resource allocation of paging channel (PCH) and downlink shared channel (DL-SCH), and hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NAK signals in response to uplink transmissions. A physical uplink control channel (PUCCH) carries uplink control information such as HARQ AC/NAK in response to downlink transmission, scheduling request and channel quality indicator (CQI). A physical uplink shared channel (PUSCH) carries uplink shared channel (UL-SCH).

Figure 3:
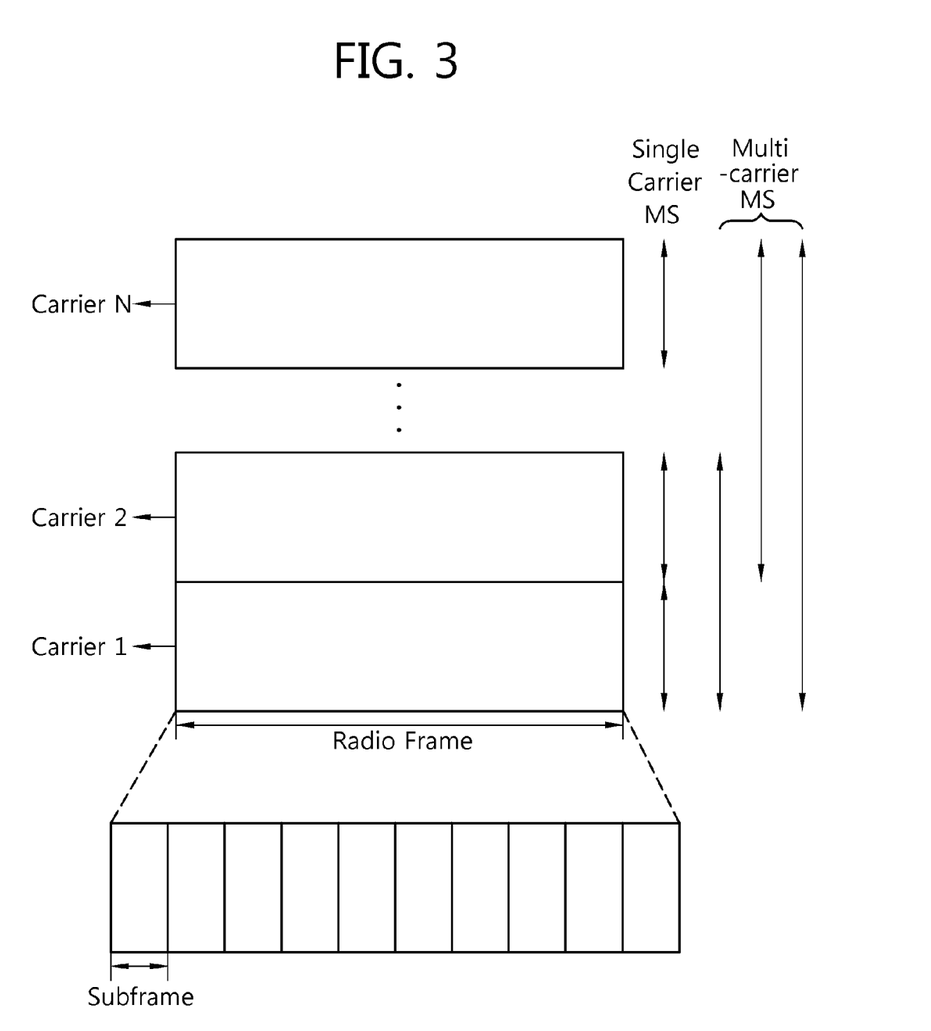
FIG. 3 illustrates an example of a frame structure for operating multiple carriers.

FIG. 3 illustrates an example of a frame structure for operating multiple carriers. A radio frame includes 10 subframes. Each CC may have its own control channel, i.e. PDCCH. Some CCs may have only a portion of the SFH. Multiple CCs may be or may not be contiguous to each other. A UE may support one or more CCs according to its capability.

CCs may be divided into a fully configured CC and a partially configured CC depending on their directionality. The fully configured CC refers to a bidirectional CC that can transmit and/or receive every control signal and data, and the partially configured CC refers to a unidirectional CC that can transmit only downlink data. The partially configured CC may be largely used for an MBS (Multicast and Broadcast Service) and/or an SFN (Single Frequency Network). The fully configured CC is a standalone CC for which all control channels including synchronization, broadcast, multicast and unicast control signaling are configured. The partially configured CC is a CC configured for downlink only transmission in TDD or a downlink CC without paired UL CC in FDD mode.

CCs may be divided into a primary CC and a secondary CC depending on whether they are activated. The primary CC refers to a CC that is constantly activated, and the secondary CC refers to a CC that is activated or deactivated according to particular conditions. Activation means that transmission or reception of traffic data is performed or traffic data is ready for its transmission or reception. Deactivation means that transmission or reception of traffic data is not permitted. In the deactivation, measurement is made or minimum information can be transmitted or received. The UE uses only a single primary CC or one or more secondary CCs along with the primary CC. The UE may be assigned the primary CC and/or the second CCs by the BS. A primary CC is a CC used by a BS to exchange traffic and PHY/MAC control signaling (e.g., MAC control messages) with a UE. Secondary CCs are additional CCs which the UE may use for traffic, only per BS's specific commands and rules received on the primary CC. The primary CC may be a fully configured CC, by which major control information is exchanged between the BS and the UE. The secondary CC may be a fully configured CC or a partially configured CC, which is allocated according to a request of the UE or according to an instruction of the BS. The primary CC may be used for entering of the UE into a network or for an allocation of the secondary CC. The primary carrier may be selected from among fully configured CCs, rather than being fixed to a particular CC. A CC set as the secondary CC may be changed to a primary CC.

Figure 4:
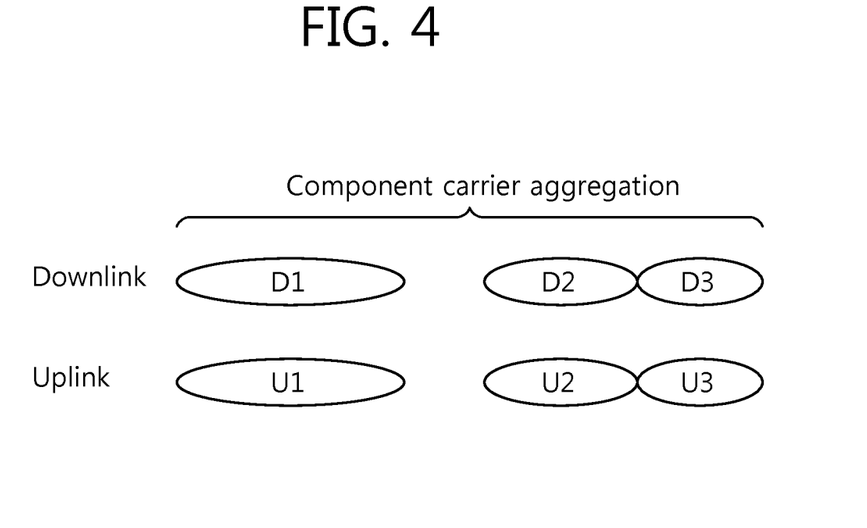
FIG. 4 shows a mapping relation between a downlink carrier and an uplink carrier in a multiple carrier system according to the present invention.

FIG. 4 shows a mapping relation between a downlink CC and an uplink CC in a multiple CC system according to the present invention.

Referring to FIG. 4, in a FDD system, downlink CCs are mapped to respective uplink CCs. D1 is mapped to U1, D2 is mapped to U2, and D3 is mapped to U3. A BS can designate D1, D2, and D3 as an aggregation of downlink CCs and U1, U2, and U3 as an aggregation of uplink CCs. A UE checks a correspondence and a mapping relation between the downlink CCs and the uplink CCs on the basis of system information transmitted by a logical channel BCCH or a UE-dedicated RRC message transmitted by a logical channel DCCH. Although the one-to-one mapping relation between the downlink CCs and the uplink CCs is illustrated in FIG. 4, the downlink CCs and the uplink CCs can have a mapping relation of 1:n or n:1.

In handling a RLF, a UE configured with a plurality of aggregated CCs maintains one RLF timer or more to detect the RLF. The RLF timer is also referred to as T310.

The RLF timer starts upon detecting physical layer problems i.e. upon receiving N310 consecutive out-of-sync indications from lower layers. The N310 is the maximum number of consecutive "out-of-sync" indications received from lower layers. And the RLF timer stops upon receiving N311 consecutive in-sync indications from lower layers, upon triggering the handover procedure and upon initiating the connection re-establishment procedure. The N311 is the maximum number of consecutive "in-sync" indications received from lower layers. If the physical layer problems are not recovered until the RLF timer expires, an upper layer declares a RLF and performs the connection re-establishment procedure.

In an embodiment, a UE capable of transmitting data on aggregated CCs maintains a plurality of RLF timers. Each RLF timer is configured per CC i.e. CC specific RLF timer. For example, RLF timer 1 is configured for a CC1 and RLF timer 2 is configured for a CC2.

A BS can configure one UE with different RLF timer values. For instance, RLF timer 1 for a CC1 has RLF timer value a, and another RLF timer 2 for a CC2 has RLF timer value b, and a≠b.

Or, a BS can configure one UE with one RLF timer value which is used for all CCs configured for the UE. If a UE is configured with aggregated multiple CCs, but configured only with the same RLF timer value, then the UE uses the RLF timer value for all configured CCs. For example, RLF timer 3 for a CC1 has RLF timer value c, and another RLF timer 4 for a CC2 has RLF timer value d, and c=d.

In another embodiment, a UE capable of transmitting data on aggregated CCs maintains only one RLF timer for all configured CCs. For example, if a UE is configured with aggregated CCs CC1 and CC2, then one RLF timer is applied to the CC1 and CC2. And the one RLF timer value is configured for the CC1 and CC2. The one RLF timer is used to perform the RRC connection reestablishment procedure.

In yet another embodiment, a UE capable of transmitting data on aggregated CCs maintains a plurality of N310s. Each N310 exists per CC which is configured for the UE. For an example, the BS configures one UE with different N310 values for different CCs, i.e. a first N310 for a CC1 and a second N310 for a CC2. For another example, if a UE is configured with multiple CCs, but configured only with one N310 value, the one N310 value is applied to all configured CCs, i.e. a first N310 for a CC1 and CC2.

In yet another example, a UE capable of transmitting data on aggregated CCs maintains a plurality of N311s. Each N311 exists per CC which is configured for the UE. For an example, the BS configures one UE with different N311 values for different CCs, i.e. a first N311 for a CC1 and a second N311 for a CC2. For another example, if a UE is configured with multiple CCs, but configured only with one N311 value, the one N311 value is applied to all configured CCs, i.e. a first N311 for a CC1 and CC2.

Other examples may also be envisaged within the framework of the present invention, as will appear to one skilled in the art.

A method of handling a radio link failure (RLF) in a multiple-carrier system according to an exemplary embodiment of the present invention will now be described.

Figure 5:
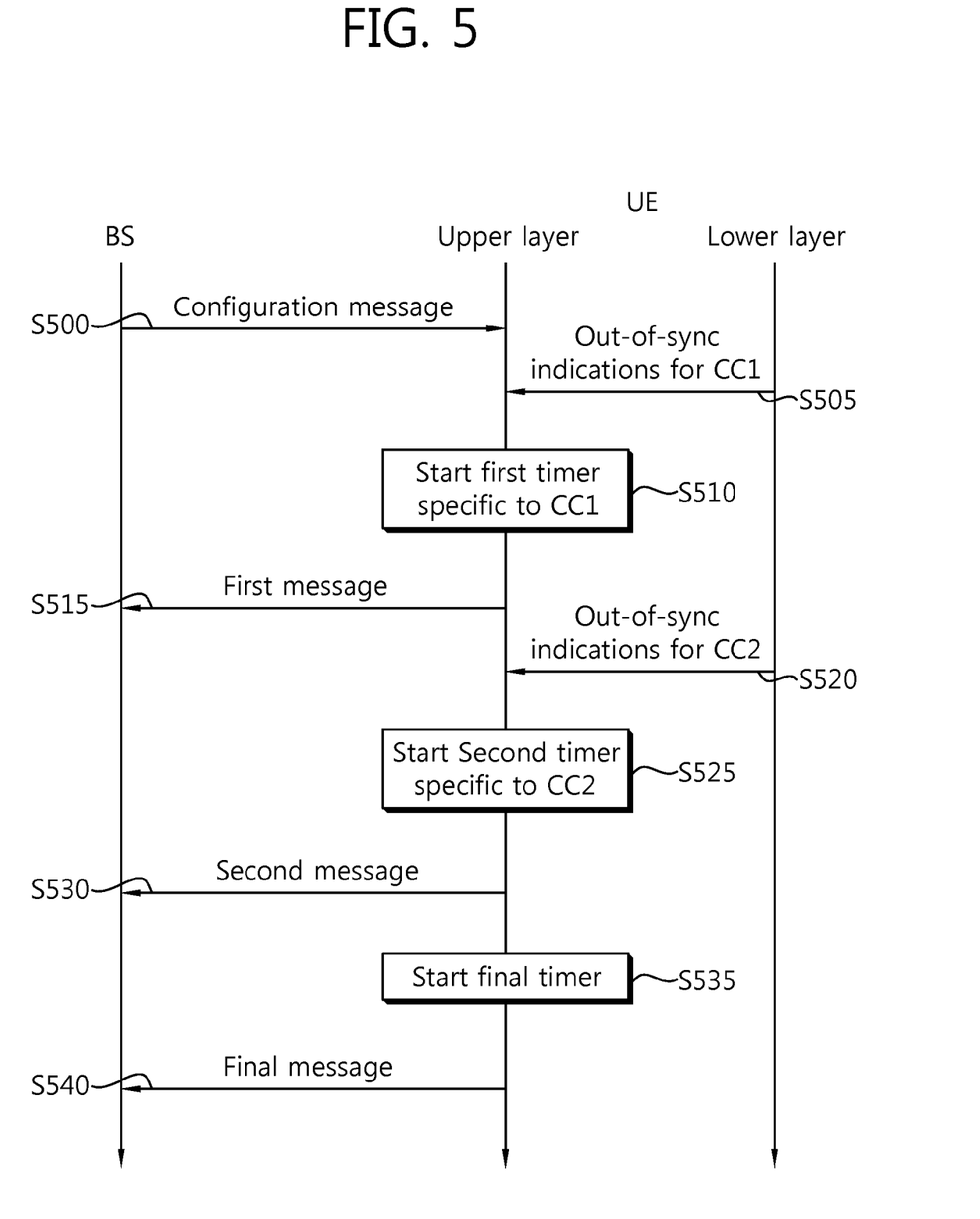
FIG. 5 is a flow chart illustrating the process of handing a radio link failure in a multiple-carrier system according to an embodiment of the present invention.

FIG. 5 is a flow chart illustrating the process of handing a radio link failure in a multiple-carrier system according to an embodiment of the present invention. The UE could be configured with multiple CCs e.g. CC1 and CC2. The UE could be additionally configured with CC3, but it is assumed that the UE does not consider CC3 as a configured CC for RLF detection e.g. because CC3 is an extension carrier which has no essential system information and/or no PDCCH for the UE. CC1 and CC2, however, have system information and/or PDCCH for the UE. Any of the steps illustrated in FIG. 5 can be omitted.

Referring to FIG. 5, a base station (BS) transmits to the UE a configuration message including information on a first timer, a second timer and a final timer 5500. The first timer, the second timer and the final timer are RLF timers, i.e. T310.

The information on a first timer, a second timer and a final timer comprises values of the first timer, a second timer and a final timer. The information on a first timer, a second timer and a final timer also comprises indicators indicating to which CC each timer is applied. The value of the first timer is different from the value of the second timer. Or, the value of the first timer is the same with the value of the second timer.

Even if the timers mentioned in FIG. 5 seem all different, they may represent physically one timer and nothing but have different name. For example, the first timer is the same with the second timer. Or the timers mentioned in FIG. 5 are physically different.

The UE checks CC1 if there are any out-of-synchronization indications from a lower layer, i.e. a physical layer of the UE S505. This step is done at an upper layer of the UE, i.e. radio resource control (RRC) layer.

If the RRC layer of the UE detects N1 consecutive out-of-synchronization indications from the CC1, the RRC layer of the UE considers a radio link problem in the CC1 is detected. And the UE starts a first timer for CC1, which is a CC specific RLF timer S510. The radio link problem is also referred to as a CC failure.

Upon expiry of the first timer for CC1, the UE sends to the BS a first message indicating the radio link problem in the CC1 by using uplink resource on another CC, i.e. CC2 or CC3 S515.

When the RRC layer of the UE again receives N2 consecutive out-of-synchronization indications from the CC2, the RRC layer of the UE considers a radio link problem in the CC2 is detected S520. And the UE starts a second timer for CC2, which is a CC specific RLF timer S525.

Upon expiry of the second timer, the UE sends to the BS a second message indicating the radio link problem in the CC2 by using i.e. a random access procedure because there is no valid CC providing uplink resource S530. The first message and the second message are RRC messages.

The RRC layer of the UE starts a final timer, i.e. T310, if the RRC layer of the UE considers the radio link problems in all configure CCs, CC1 and CC2 for the UE S535.

Upon receiving M1 consecutive in-synchronization indications from the same CC, either CC1 or CC2 while the final timer is running, the RRC layer of the UE shall stop the final timer and consider that the CC with M1 consecutive in-synchronization indications is recovered from the radio link problem (or a CC failure). For instance, upon receiving M consecutive in-synchronization indications from CC1 while the final timer is running, the RRC layer of the UE considers that CC1 is recovered from radio link problem and stop the final timer.

The UE has no radio link problem in CC1 from the moment when CC1 is recovered from the radio link problem. However, the UE still experiences the radio link problem in CC2. Thus, when the UE has radio link problem in CC1 again, the RRC layer of the UE re-starts the final timer because the RRC layer of the UE considers radio link problem to be detected on all configured CCs.

Upon expiry of the final timer, the RRC layer of the UE considers a radio link failure to be detected and then the UE transmits a final message to request radio connection re-establishment with the BS S540. This step initiates the connection re-establishment procedure.

By using a plurality of different timers on CCs configured for one UE, the meaning of RLF in a multiple-carrier system for triggering radio connection re-establishment procedure is clarified and defined in detail.

Figure 6:
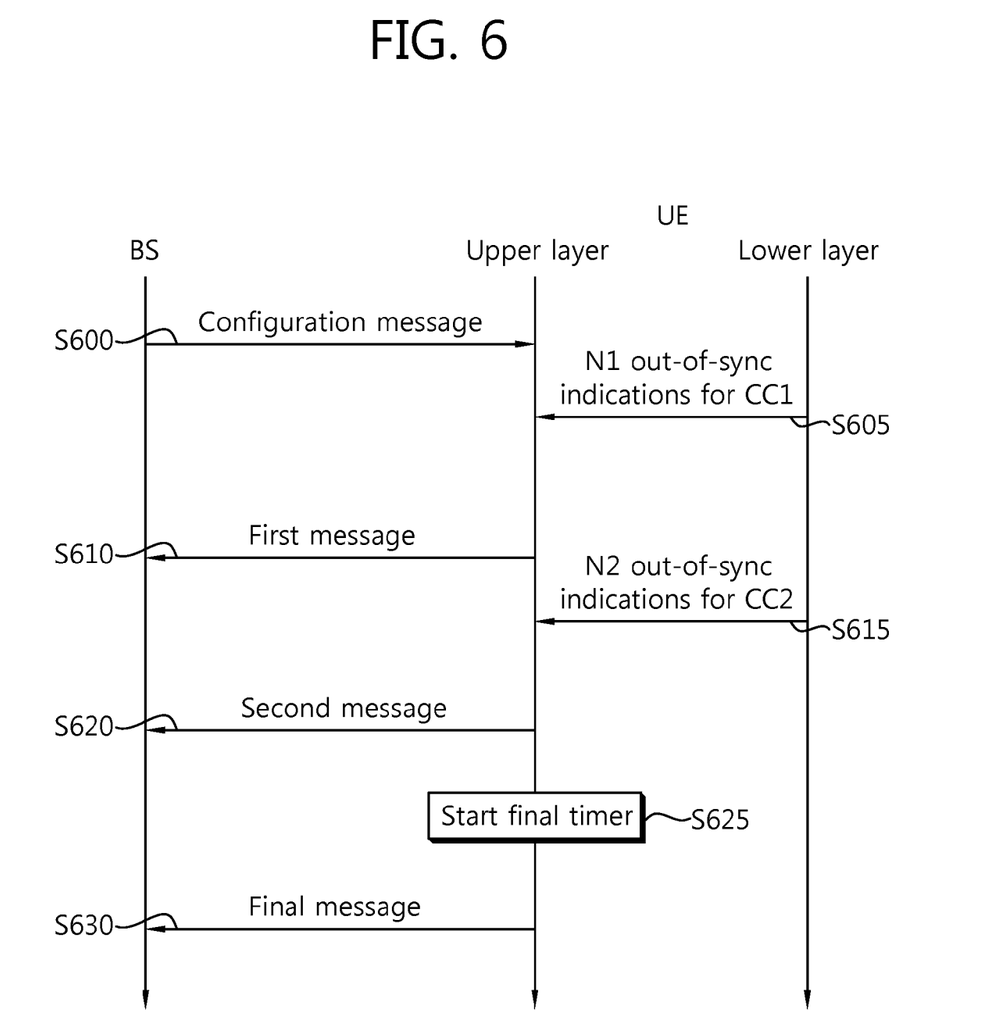
FIG. 6 is a flow chart illustrating the process of handing a radio link failure in a multiple-carrier system according to another embodiment of the present invention.

FIG. 6 is a flow chart illustrating the process of handing a radio link failure in a multiple-carrier system according to another embodiment of the present invention.

Referring to FIG. 6, a base station (BS) transmits to a UE a configuration message including information on N1 for CC1 and N2 for CC2 and a value of a final timer S600. The final timer is RLF timers, i.e. T310. The N1 and the N2 are N310s as illustrated above. The N1 is different from the N2. Or, the N1 is the same with the N2.

If an upper layer of the UE detects N1 consecutive out-of-synchronization indications for CC1 from a lower layer, i.e. a physical layer of the UE, the upper layer of the UE detects a radio link problem in the CC1 S605. The upper layer can be a RRC layer or a MAC layer.

The UE sends to the BS a first message indicating the radio link problem in the CC1 by using uplink resource on another CC, i.e. CC2 or CC3 S610.

When the RRC layer of the UE again receives N2 consecutive out-of-synchronization indications from the CC2, the RRC layer of the UE detects a radio link problem in the CC2 S615.

The UE sends to the BS a second message indicating the radio link problem in the CC2 by using i.e. a random access procedure because there is no valid CC providing uplink resource S620.

The RRC layer of the UE starts a final timer, i.e. T310, if the RRC layer of the UE considers the radio link problems in all configure CCs, CC1 and CC2 for the UE S625.

Upon expiry of the final timer, the RRC layer of the UE considers a radio link failure to be detected and then the UE transmits a final message to request radio connection re-establishment with the BS S630.

By eliminating timers which trigger CC failure reports, the procedure for handling RLF in a multiple-carrier system is more simplified.

Figure 7:
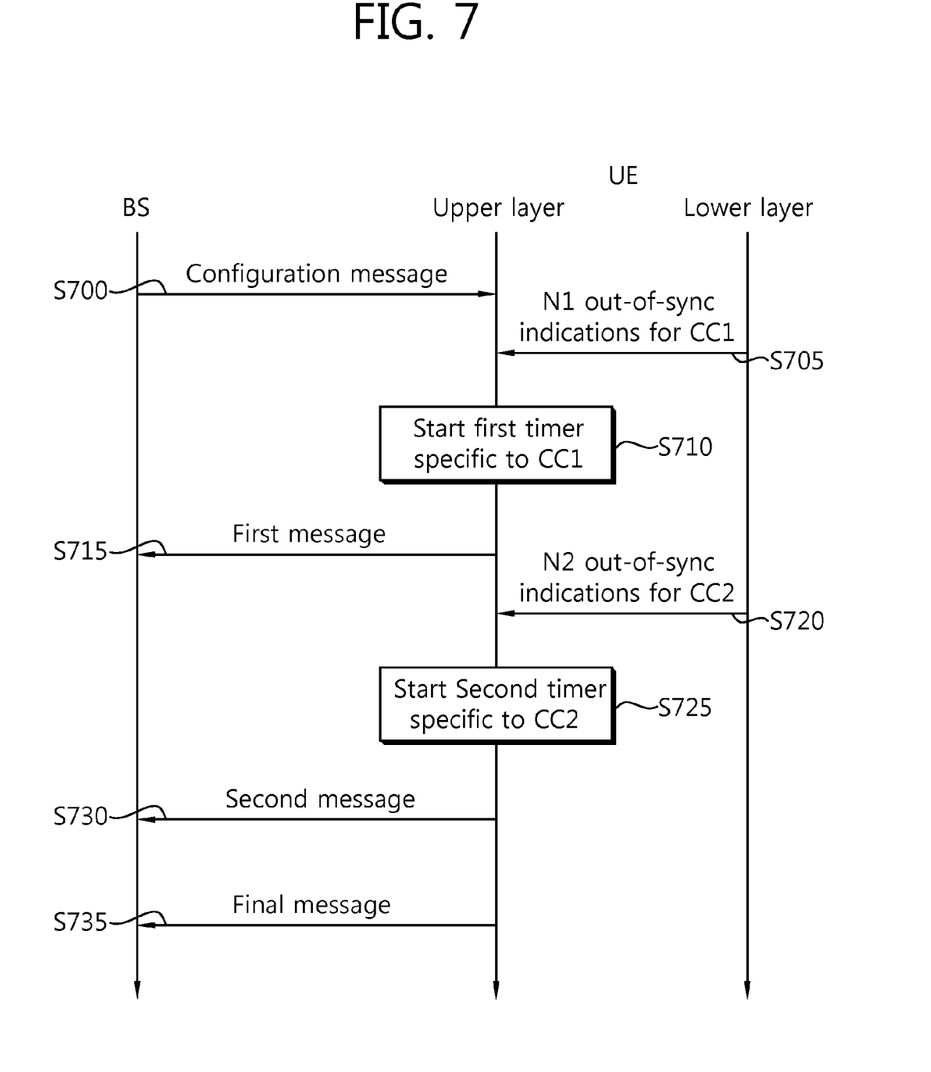
FIG. 7 is a flow chart illustrating the process of handing a radio link failure in a multiple-carrier system according to yet another embodiment of the present invention.

FIG. 7 is a flow chart illustrating the process of handing a radio link failure in a multiple-carrier system according to yet another embodiment of the present invention.

Referring to FIG. 7, a base station (BS) transmits to a UE a configuration message including information on a first timer and a second timer S700. The first timer and the second timer are RLF timers, i.e. T310.

The information on a first timer and a second timer comprises values of the first timer and a second timer. The information on a first timer and a second timer also comprises indicators indicating to which CC each timer is applied. The value of the first timer is different from the value of the second timer. Or, the value of the first timer is the same with the value of the second timer.

Even if the timers mentioned in FIG. 7 seem all different, they may represent physically one timer and nothing but have different name. For example, the first timer is the same with the second timer. Or the timers mentioned in FIG. 7 are physically different.

The UE checks if there are any out-of-synchronization indications from a lower layer, i.e. a physical layer regarding CC1 of the UE S705. This step is done at an upper layer of the UE, i.e. radio resource control (RRC) layer.

If the RRC layer of the UE detects N1 consecutive out-of-synchronization indications from the CC1, the RRC layer of the UE considers a radio link problem in the CC1 is detected. And the UE starts a first timer for CC1, which is a CC specific RLF timer S710.

Upon expiry of the first timer for CC1, the UE sends to the BS a first message indicating the radio link problem in the CC1 by using uplink resource on another CC, i.e. CC2 or CC3 S715.

When the RRC layer of the UE again receives N2 consecutive out-of-synchronization indications from the CC2, the RRC layer of the UE considers a radio link problem in the CC2 is detected S720. And the UE starts a second timer for CC2, which is a CC specific RLF timer S725.

Upon expiry of the second timer, the UE sends to the BS a second message indicating the radio link problem in the CC2 by using i.e. a random access procedure because there is no valid CC providing uplink resource S730. The first message and the second message are RRC messages.

The RRC layer of the UE considers a radio link failure to be detected based on the radio link problems in CC1 and CC2. And the UE transmits a final message to request radio connection re-establishment with the BS S735.

By eliminating a final timer which triggers radio link failure reports, the procedure for handling RLF in a multiple-carrier system is more simplified.

The aforementioned functions can be executed by processors such as microprocessors, controllers, microcontrollers, application specific integrated circuits (ASICs) and so on according to software or program codes coded to execute the functions. The design, development and implementation of the codes are obvious to those skilled in the art.

While the present invention has been particularly shown an described with reference to exemplary embodiments thereof, it will be understood by those of ordinary skill in the art that various changes in form and details may be made therein without departing from the spirit and scope of the present invention as defined by the following claims.

What is claimed is:

1. A method of handling a radio link failure in a multiple-carrier system performed by a user equipment (UE), the method comprising:

receiving data from a base station (BS) by using a plurality of carriers including a first carrier and a second carrier;

detecting a first radio link problem for the first carrier;

determining whether the first carrier is an extension carrier which does not carry a physical downlink control channel (PDCCH);

if the first carrier is not the extension carrier, starting a first timer for the first carrier, wherein the first timer is not started if the first carrier is the extension carrier;

transmitting, to the BS, a first message indicating the first radio link problem for the first carrier via uplink resource of the second carrier upon expiry of the first timer;

detecting a second radio link problem for the second carrier;

determining whether the second carrier is the extension carrier;

if the second carrier is not the extension carrier, starting a second timer for the second carrier, wherein the second timer is not started if the second carrier is the extension carrier;

transmitting, to the BS, a second message indicating the second radio link problem for the second carrier upon expiry of the second timer;

starting a final timer, if radio link problems in all of the plurality of carriers are detected; and transmitting, to the BS, a final message requesting a connection re-establishment upon expiry of the final timer, wherein the first carrier and the second carrier are aggregated.

2. The method of claim 1, wherein the first message, the second message and the final message are radio resource control (RRC) messages.

3. The method of claim 1, wherein the value of the first timer is different from the value of the second timer.

4. The method of claim 1, wherein the value of the first timer is the same with the value of the second timer.

5. The method of claim 1, wherein the first timer is the same with the second timer.

6. The method of claim 1, wherein the second timer is started after the first timer expires.

7. The method of claim 1, wherein the first radio link problem is detected based on consecutive out-of-synchronization indications for the first carrier from a physical layer.

8. The method of claim 7, wherein the second radio link problem is detected based on consecutive out-of-synchronization indications for the second carrier from the physical layer.

9. A user equipment for handling a radio link failure in a multiple-carrier system, comprising:
a transceiver;
a processor coupled to the transceiver and configured to:
receive data from a base station (BS) by using a plurality of carriers including a first carrier and a second carrier;
detect a first radio link problem for the first carrier;
determine whether the first carrier is an extension carrier which does not carry a physical downlink control channel (PDCCH);
if the first carrier is not the extension carrier, start a first timer for the first carrier, wherein the first timer is not started if the first carrier is the extension carrier;
transmit, to the BS, a first message indicating the first radio link problem for the first carrier via uplink resource of the second carrier upon expiry of the first timer;
detect a second radio link problem for the second carrier;
determine whether the second carrier is the extension carrier;
if the second carrier is not the extension carrier, start a second timer for the second carrier, wherein the second timer is not started if the second carrier is the extension carrier
transmit, to the BS, a second message indicating the second radio link problem for the second carrier upon expiry of the second timer;
start a final timer, if radio link problems in all of the plurality of carriers are detected; and
transmit, to the BS, a final message requesting a connection re-establishment upon expiry of the final timer,
wherein the first carrier and the second carrier are aggregated.

* * * * *